US010963223B1

(12) United States Patent
Wilson-Thomas et al.

(10) Patent No.: US 10,963,223 B1
(45) Date of Patent: Mar. 30, 2021

(54) RULES GENERATION USING LEARNED REPETITIVE CODE EDITS

(71) Applicant: Microsoft Technology Licensing, LLC, Redmond, WA (US)

(72) Inventors: Mark Alistair Wilson-Thomas, Mercer Island, WA (US); Gustavo Araujo Soares, Seattle, WA (US); Peter Groenewegen, Vancouver (CA); Jonathan Preston Carter, Seattle, WA (US); German David Obando Chacon, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/667,604

(22) Filed: Oct. 29, 2019

(51) Int. Cl.
*G06F 8/30* (2018.01)

(52) U.S. Cl.
CPC ..................... *G06F 8/30* (2013.01)

(58) Field of Classification Search
None
See application file for complete search history.

(56) References Cited

U.S. PATENT DOCUMENTS

| | | | | |
|---|---|---|---|---|
| 2002/0152081 | A1* | 10/2002 | Kitamura | G06F 40/55 704/277 |
| 2007/0106494 | A1* | 5/2007 | Detlef | G10L 15/26 704/9 |
| 2014/0101181 | A1* | 4/2014 | Shyryayev | G06F 16/84 707/756 |
| 2020/0285803 | A1* | 9/2020 | Edge | G06F 40/103 |

* cited by examiner

*Primary Examiner* — Qing Chen
(74) *Attorney, Agent, or Firm* — Workman Nydegger

(57) ABSTRACT

Assisting automation of repeated edits of code by automated generation of rules that, when applied, perform code transformations. The transformations are synthesized while observing developers make repeated code edits, and automatically perform similar modifications as those observed. This synthesized transformation defines an initial state of code to which the transformation can be applied, and defines a modification from that initial state. A rule is then generated that includes a detector mechanism that, when selected, is configured to find locations in code that have the defined corresponding initial state of the corresponding transformation. Thus, the transformation may be applied to any code to which the rule is exposed.

19 Claims, 18 Drawing Sheets

```
12      {
13    }
14
      0 references
15    private string CreateRq1row(int id, RunResult generalizationResults, RunResult coverageResult, RunResult naiveResults, RunResult optimizedResults
16    {
17        bool success = | generalizationResults.Success;
18        bool success1 = coverageResult.Success;
19        bool success2 = naiveResults.Success;
20        bool success3 = optimizedResults.Success;
21        return $"{id}, {success}, {success1}, {success2}, {success3}";
22
23
24    }
25
```

FIG. 8A

```
12      {
13    }
14
      0 references
15    private string CreateRq1row(int id, RunResult generalizationResults, RunResult coverageResult, RunResult naiveResults, RunResult optimizedResults
16    {
17        bool success = generalizationResults.Timeout ? "timeout" ? generalizationResults.Success;
18        bool success1 = coverageResult.Success;
19        bool success2 = naiveResults.Success;
20        bool success3 = optimizedResults.Success;
21        return $"{id}, {success}, {success1}, {success2}, {success3}";
22
23
24    }
25
```

```
0 references
private string CreateRq1row(int id, RunResult generalizationResults, RunResult coverageResult, RunResult naiveResults, RunResult optimizedResults
{
    string[] success = generalizationResults.Timeout ? "timeout" : generalizationResults.Success.ToString();
    bool success1 = coverageResult.Success;
    bool success2 = naiveResults.Success;
    bool success3 = optimizedResults.Success;
    return $"{id}, {success1}, {success2}, {success3}";
}
```

FIG. 8E

```
0 references
private string CreateRq1row(int id, RunResult generalizationResults, RunResult coverageResult, RunResult naiveResults, RunResult optimizedResults
{
    string success = generalizationResults.Timeout ? "timeout" : generalizationResults.Success.ToString();
    string[] success1 = coverageResult.Success;
    bool success2 = naiveResults.Success;
    bool success3 = optimizedResults.Success;
    return $"{id}, {success1}, {success2}, {success3}";
}
```

FIG. 8F

```
12
13
14     0 references
       private string CreateRq1row(int id, RunResult generalizationResults, RunResult coverageResult, RunResult naiveResults, RunResult optimizedResults
15     {
16         string success = generalizationResults.Timeout ? "timeout" : generalizationResults.Success.ToString();
17         string success1 = coverageResult.Timeout ? "timeout" : coverageResult.Success;
18         bool success2 = naiveResults.Success;
19         bool success3 = optimizedResults.Success;
20         return $"{id}, {success1}, {success2}, {success3}";
21     }
22
23
24
25
```

FIG. 8G

```
12
13
14     0 references
       private string CreateRq1row(int id, RunResult generalizationResults, RunResult coverageResult, RunResult naiveResults, RunResult optimizedResults
15     {
16         string success = generalizationResults.Timeout ? "timeout" : generalizationResults.Success.ToString();
17         string success1 = coverageResult.Timeout ? "timeout" : coverageResult.Success.ToString();
18         bool success2 = naiveResults.Success;
19         bool success3 = optimizedResults.Success;
20         return $"{id}, {success1}, {success2}, {success3}";
21     }
22
23
24
25
```

RULES GENERATION USING LEARNED REPETITIVE CODE EDITS

BACKGROUND

Computer programs are typically generated by a group of one or more developers generating code in a source code language. Code can become quite voluminous, involving thousands, or even perhaps millions of lines of code. Developers often find themselves performing repetitive code edits to add new features, refactor, and fix bugs during software development. For instance, changing a method signature may require changing all invocations of this method in the codebase. Besides being tedious, manually performing these edits is error-prone and time consuming.

Developers often submit multiple commits to accomplish a single repetitive code edit task because they misplace where the edit should have been applied or they incorrectly apply the edit to some locations. To reduce the developer burden involved in making such mechanical edits, Integrated Development Environments (IDEs) implement transformations for some fixed classes of repetitive edits that are frequently encountered by many developers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to assisting automation of repeated edits of code by automated generation of rules that, when applied, perform code transformations. The transformations are synthesized while observing developers make repeated code edits, and automatically perform similar modifications as those observed. This synthesized transformation defines an initial state of code to which the transformation can be applied, and defines a modification from that initial state. If the developer accepts a transformation by applying the transformation to other portion(s) of the code, that is further human validation of the transformation.

A rule is then generated that includes a detector mechanism that, when selected, is configured to find locations in code that have the defined corresponding initial state of the corresponding transformation. The rule also has a corresponding transformer mechanism that, when selected, is configured to perform the defined transformation. The rule is then exposed so that, when selected, the corresponding detector mechanism may find appropriate places in code where the corresponding transformation may occur, and then apply the transformation. Thus, the transformation may be applied to any code to which the rule is exposed.

This process may repeat for any number of rules. The rules may go through a number of stages of social review. When the rule passes a stage of social review, the rule's credibility, scope of applicability, and perhaps conflict priority may increase. When the rule fails a stage of social review, the rule's credibility, scope of applicability, and perhaps conflict priority may decrease, and potentially the rule may be discarded altogether.

Thus, a dynamic pool of rules may be made available, with rules coming into being, being eliminated, or gaining or lowering in applicability, depending on social review. Thus, computerized generation of rules, enhanced by social review, is employed to make code modification rules more widely available and applicable, thus enhancing the ability to effectively and efficiently generate code—the driver of computing system functionality.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 8A through 8L illustrate several user interfaces in sequence that collectively show a user experience in which a developer makes a repeated edit of different lines of code, and then the computing system thereafter automatically makes the edits for the developer for other lines of the code;

FIG. 11 illustrate several sub-transformation sequences, each being capable of, when executed, transforming the code from state S1 to S6 of FIGS. 10A and 10B;

DETAILED DESCRIPTION

At least some embodiments described herein relate to assisting automation of repeated edits of code by automated generation of rules that, when applied, perform code transformations. The transformations are synthesized while observing developers make repeated code edits, and automatically perform similar modifications as those observed. This synthesized transformation defines an initial state of code to which the transformation can be applied, and defines a modification from that initial state. If the developer accepts a transformation by applying the transformation to other portion(s) of the code, that is further human validation of the transformation.

A rule is then generated that includes a detector mechanism that, when selected, is configured to find locations in code that have the defined corresponding initial state of the corresponding transformation. The rule also has a corresponding transformer mechanism that, when selected, is configured to perform the defined transformation. The rule is then exposed so that, when selected, the corresponding detector mechanism may find appropriate places in code where the corresponding transformation may occur, and then apply the transformation. Thus, the transformation may be applied to any code to which the rule is exposed.

This process may repeat for any number of rules. The rules may go through a number of stages of social review. When the rule passes a stage of social review, the rule's credibility, scope of applicability, and perhaps conflict priority may increase. When the rule fails a stage of social review, the rule's credibility, scope of applicability, and perhaps conflict priority may decrease, and potentially the rule may be discarded altogether.

Thus, a dynamic pool of rules may be made available, with rules coming into being, being eliminated, or gaining or lowering in applicability, depending on social review. Thus, computerized generation of rules, enhanced by social review, is employed to make code modification rules more widely available and applicable, thus enhancing the ability to effectively and efficiently generate code—the driver of computing system functionality.

Figure 1:
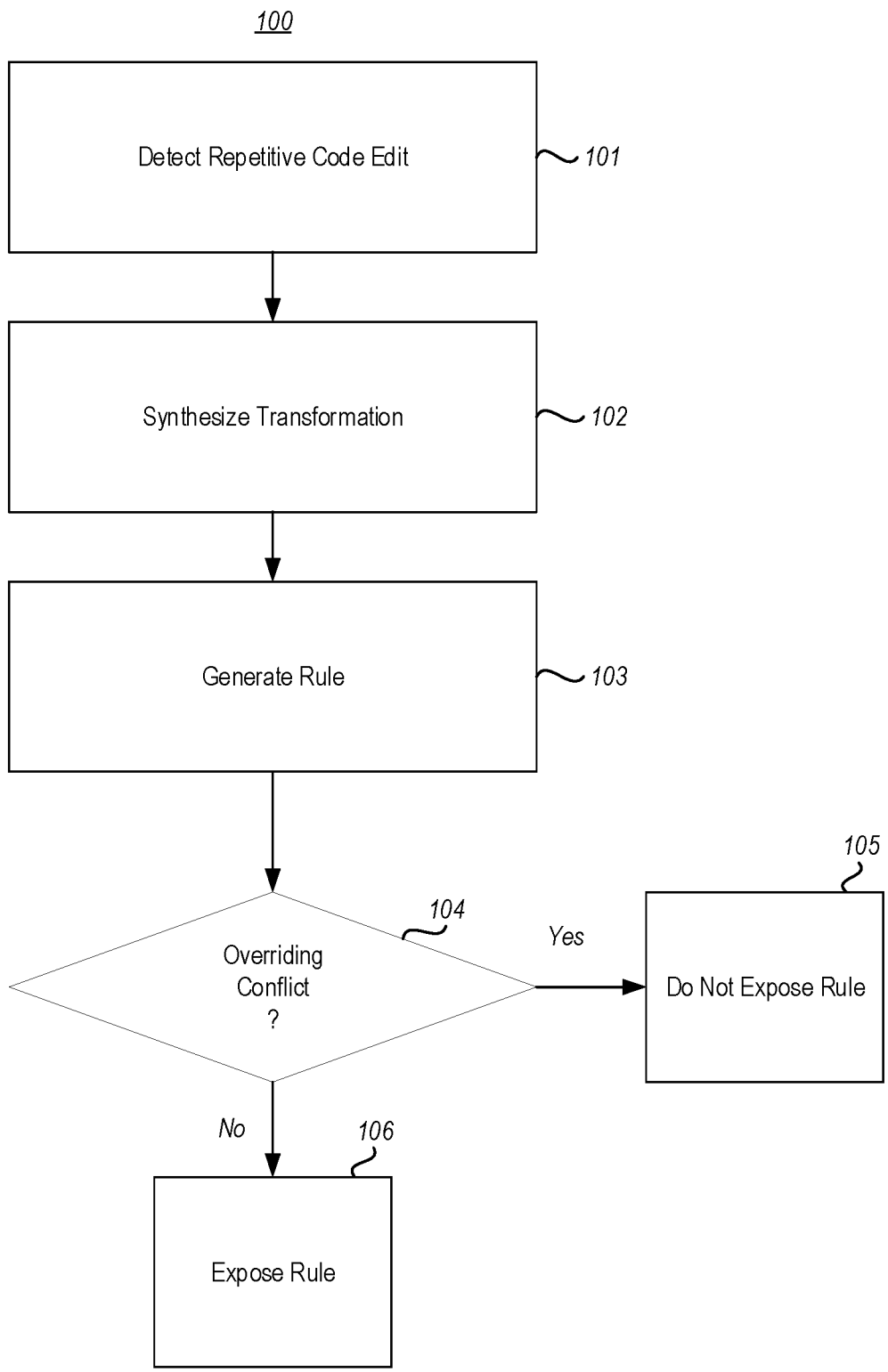
FIG. 1 illustrates a flowchart of a method for assisting automation of repeated edits of code, in accordance with the principles described herein.

FIG. 1 illustrates a flowchart of a method 100 for assisting automation of repeated edits of code, in accordance with the principles described herein. The method 100 may be performed by a computing system, such as the computing system 1300 described below with respect to FIG. 13. For instance, the method 100 may be performed by one or more processors (e.g., the hardware processing unit 1302) of the computing system 1300 executing computer-executable instructions that are on one or more computer-readable media (e.g., memory 1304). This computing system may be the same computing system that the developer is using to author code. Alternatively, the developer may edit the code on a client computing system, while the method 100 is performed on another computing system, such as in a cloud computing environment that has access to the code that the developer is editing.

The method 100 includes detecting a corresponding repetitive code edit made by a developer to code; (act 101). The method 100 then includes synthesizing a transformation that, when applied, performs a code modification corresponding to the detected repetitive code edit. This includes defining an initial state of the repetitive code edit as well as defining a corresponding transformation. The transformation can be applied anywhere the defined initial state is found by applying the defined transformation. An example of how this detection of the repetitive code edit (act 101) and the synthesizing of a corresponding transformation (act 102) may be performed will be described with respect to FIGS. 8A through 12. The detection of code edits may be performed even where the edits are not identical, but just semantically similar.

Then, a corresponding rule is automatically generated for that transformation (act 103). This corresponding rule includes a detection mechanism that (when selected) is configured to find locations in the code that have the defined initial state. The corresponding rule also has a transformer mechanism that (when selected) is configured to perform the defined corresponding transformation at one or more positions having the defined initial state of the corresponding repetitive code edit.

Here, the generated rule might be compared against other rules to determine whether there is a conflict with any previously exposed rules (decision block 104). For instance, there may be a conflict if the generated rule has a conflict priority that is less than a conflict priority of an already existing rule ("Yes" in decision block 104). In that case, the rule would not be exposed (act 105). On the other hand, if there was no such conflict ("No" in decision block 104), then the generated rule may be exposed (act 106) so that the rule may be selected to find places in code where the transformation could be applied (using the detection mechanism), and so that the corresponding transformation is applied at that location (using the transformer mechanism). In this way, the generated corresponding rule may be used to apply the learned corresponding repetitive code edit. The method 100 of FIG. 1 will now be described with frequent reference to an example environment described below with respect to FIGS. 2 through 7.

Figure 2:
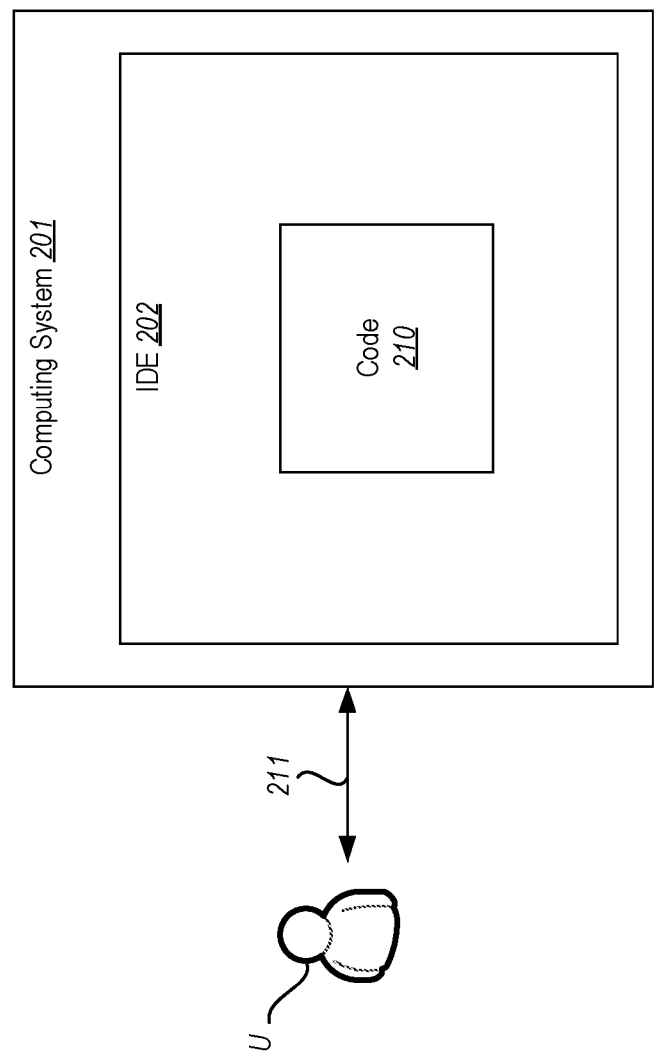
FIG. 2 illustrates an environment in which the principles described herein may be practiced, in which a user is authoring or editing code.

FIG. 2 illustrates an environment 200 in which the principles described herein may be practiced. The environment 200 includes computing system 201 that is used by a user U in order to author code 210. As an example, the computing system 201 may be structured as described below for the computing system 1300 of FIG. 13.

The user U may author code 210 using an integrated development environment (IDE) 202 running on the computing system 201. The integrated development environment 202 may be an application that runs as one of several applications operated by an operating system (not shown) of the computing system 201. The integrated development environment 202 may be structured as described below for the executable component 1306 of FIG. 13.

The process of the user U interacting with the computing system 201 in order to author and edit the code 210 is represented by the bi-directional arrow 211. The code 210 may be in any language that is suitable for authoring a computer program. For instance, source code is often used to author computer programs as source code languages are typically human readable, or at least are more intuitive to a human being than intermediary code or binary code.

Figure 3:
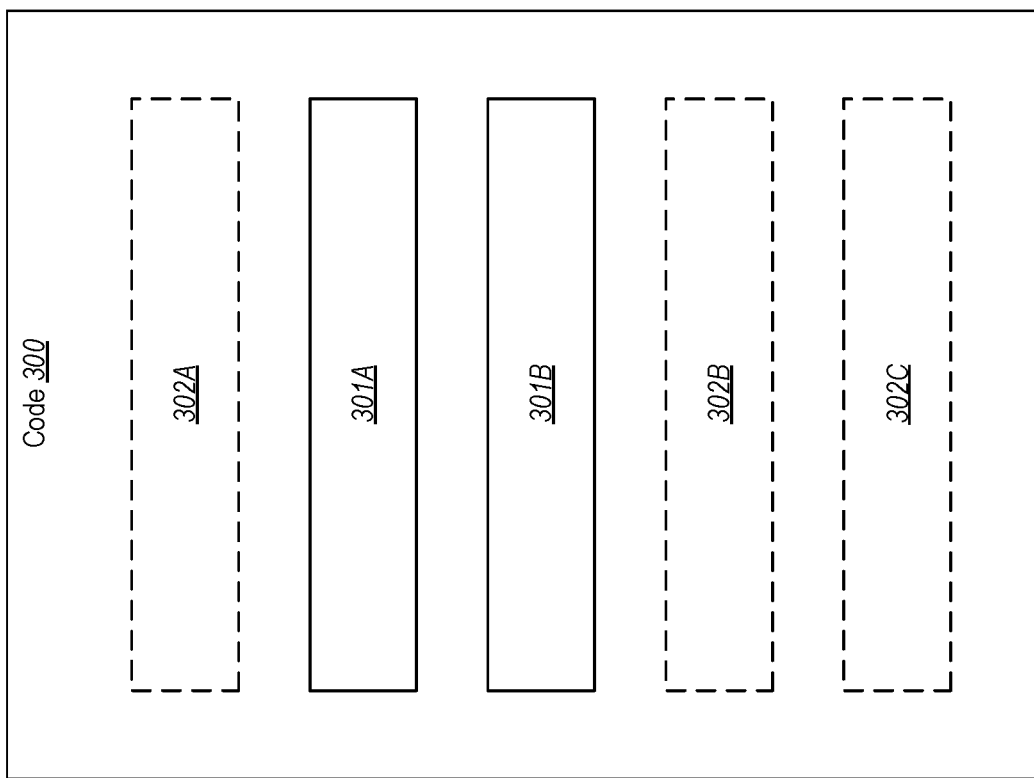
FIG. 3 symbolically illustrates code in which the developer has made several repetitive code edits that it is possible to make to other portions of the code.

FIG. 3 symbolically illustrates code 300 that is an example of the code 210 of FIG. 2. Here, as represented by the solid-bordered boxes, the user has made two repetitive code edits 301A and 301B within the code 300. However, as represented by the dashed-bordered boxes, there are other locations within the code where those same repetitive code edits could be made. For example, in the example of FIG. 3, there are three other locations 302A, 302B and 302C where the same repetitive edits could be made, but which have not yet been made.

Figure 4:
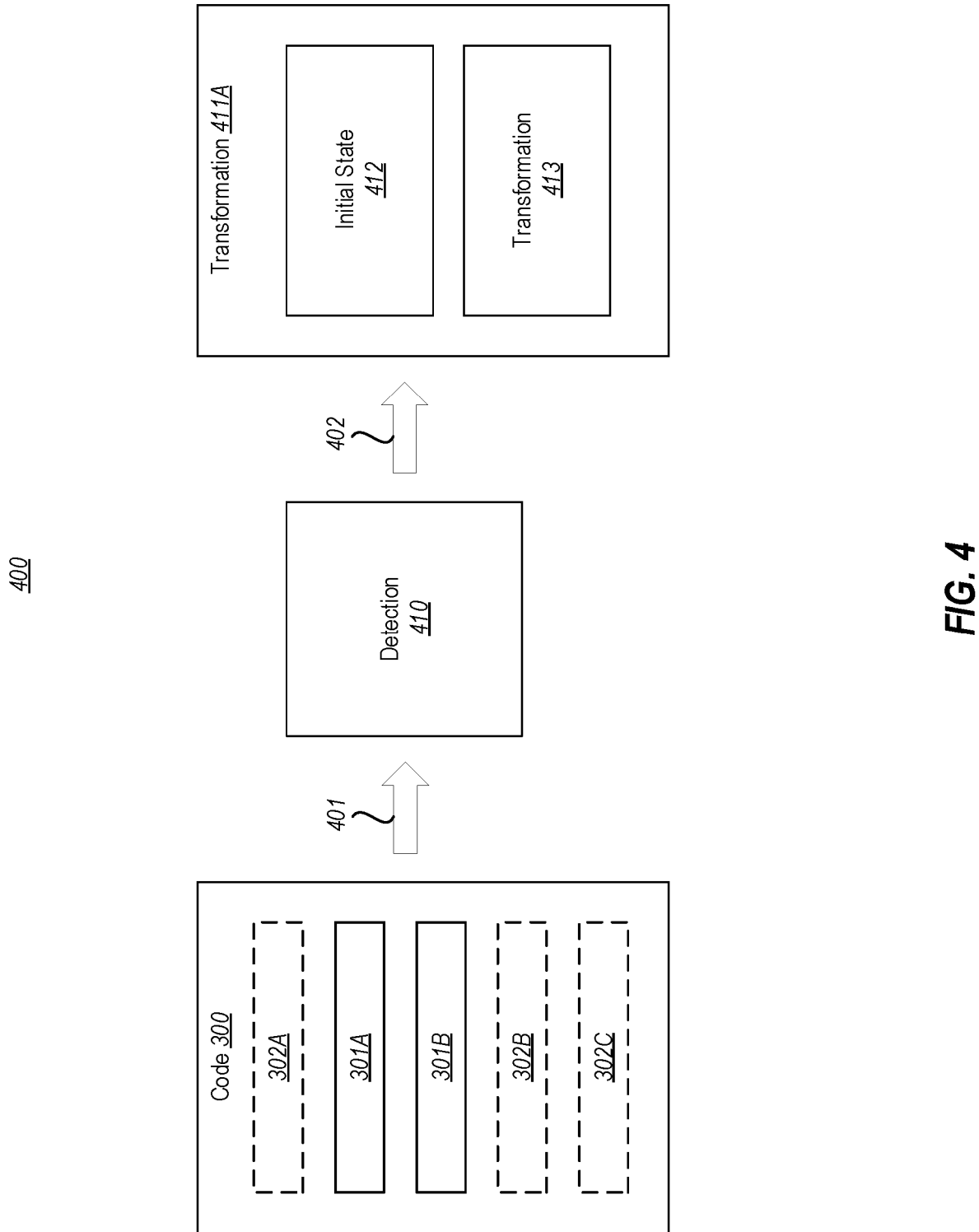
FIG. 4 illustrates an environment that expands upon the environment of FIG. 2 in that a detection component is illustrated as observing the edits made to the code and as a result generates a transformation.

In accordance with the principles described herein, repetitive code edits are detected. FIG. 4 illustrates an environment 400 that expands upon the environment 200 of FIG. 2 in that a detection component 410 is illustrated as observing the edits made to the code 300, and detects when the developer has made a repetitive code edit. As a result, the detection component 410 synthesizes a transformation that, when selected, modifies other portion(s) of code consistent with the detected repetitive code edit. This process represents an example of the acts 101 and 102 of FIG. 1. Some components of FIG. 2 (such as the computing system 201 and the IDE 202) are not represented again in FIG. 4 simply to avoid overcomplicating FIG. 4. Nevertheless, the code 300 is code that is authored or edited by a user using an IDE running on a computing system.

The detection component 410 may be part of the integrated development environment 202, or some other component of the computing system 201, may operate outside of the computing system 201 (e.g., on a server or as a service or in the cloud), or combinations of the above. The detection component 410 may be structured as described below for the executable component 1306 of FIG. 13. An example of the operation of the detection component 410 will be described further below with respect to FIGS. 8A through 12.

The transformation corresponds to the repetitive code edit represented by edits 301A and 301B. In particular, the detection component 410 observes (as represented by arrow 401) edits to the code 300 and for each observed repetitive state defines an initial state of code 412 that represents the initial state of the edits prior to the edit being made. In addition, for each observed repetitive code edit, the machine learning component 410 learns a transformation 413 from the initial state such that if the transformation is performed on any portion of the code having that same initial state, the change associated with the repetitive code edit is performed.

As a specific example, the detection component 410 observes the repetitive edits 301A and 301B and synthesizes a repetitive edit representation 411A that includes an initial state 412 and a transformation 413. Thus, if the position 302A also has the initial state 412, the transformation 413 may be performed at that position 302A to cause the same repetitive edit to be performed at the position 302A. Likewise, if the position 302B also has the initial state 412, the transformation 413 may be performed at that position 302B to cause the same repetitive edit to be performed at the position 302B. Finally, if the position 302C has the initial state 412, the transformation 413 may be performed at that position 302C to cause the same repetitive edit to be performed at the position 302C. Accordingly, one thing that can be done with the transformation 411A is to automatically apply that transformation (potentially after gaining consent of the user) to other portions of the code.

Figure 5:
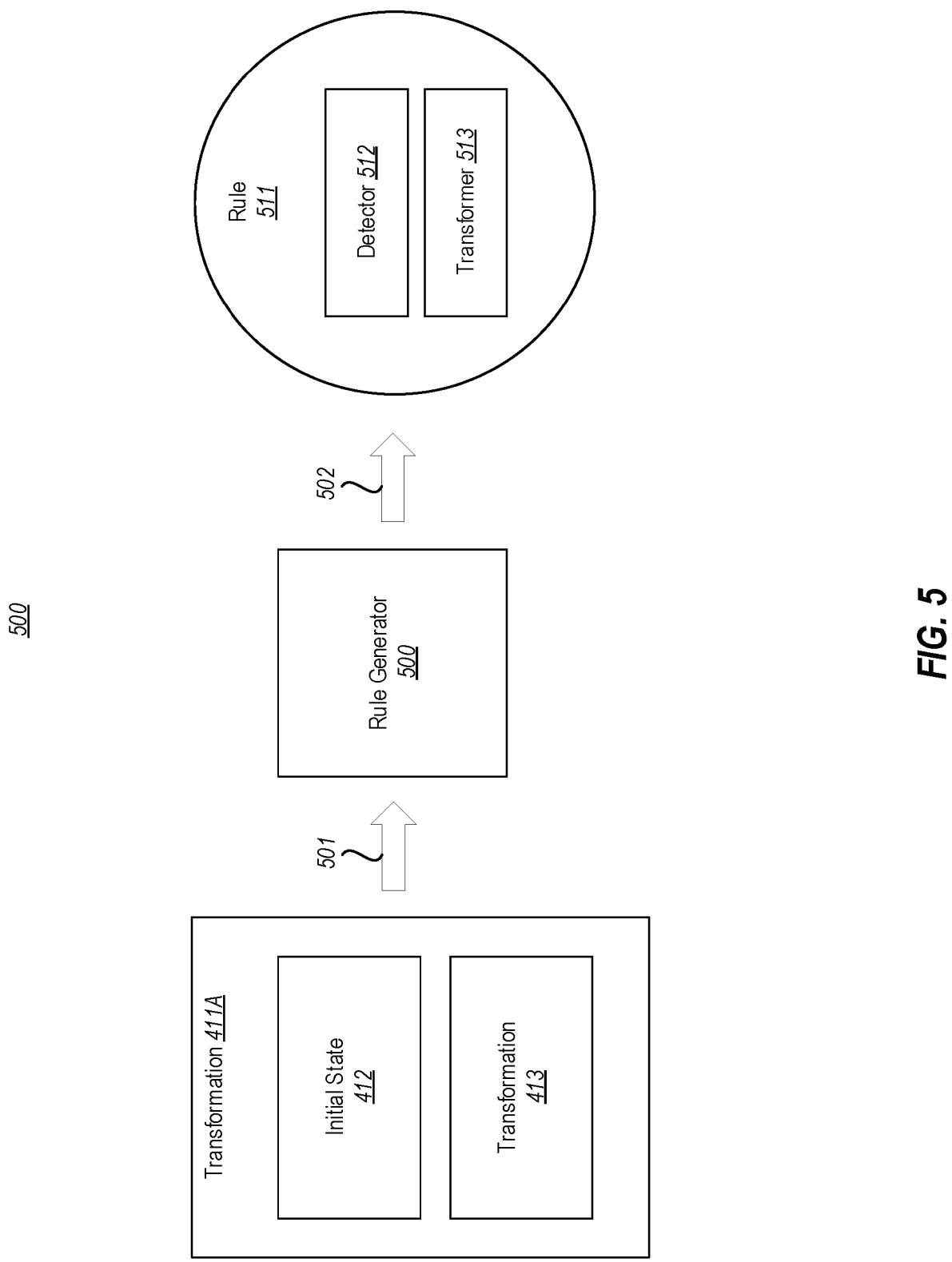
FIG. 5 illustrates a rules generator component that receives a transformation, and generates a resulting rule.

Alternatively, or in addition, the transformation may be used to generate rules that may be applied more widely. For instance, FIG. 5 illustrates an environment 500 in which a rules generator component 510 receives (as represented by arrow 501) the transformation 411A, and generates (as represented by arrow 502) a resulting rule 511. This generation represents an example of act 103 of FIG. 1. The rule 511 is generated so as to have a detector mechanism 512 that, when selected, is configured to find portions in code that have the initial state 412. Furthermore, the rule 511 is generated so as to have a transformer mechanism 513 that, when selected, is configured to apply the transformation 413 of the repetitive code edit at the detected portion(s). The rules generator component 510, the rule 511, the detector mechanism 512, and the transformer mechanism 513 may each be structured as described below for the executable component 1306 of FIG. 13.

Figure 6:
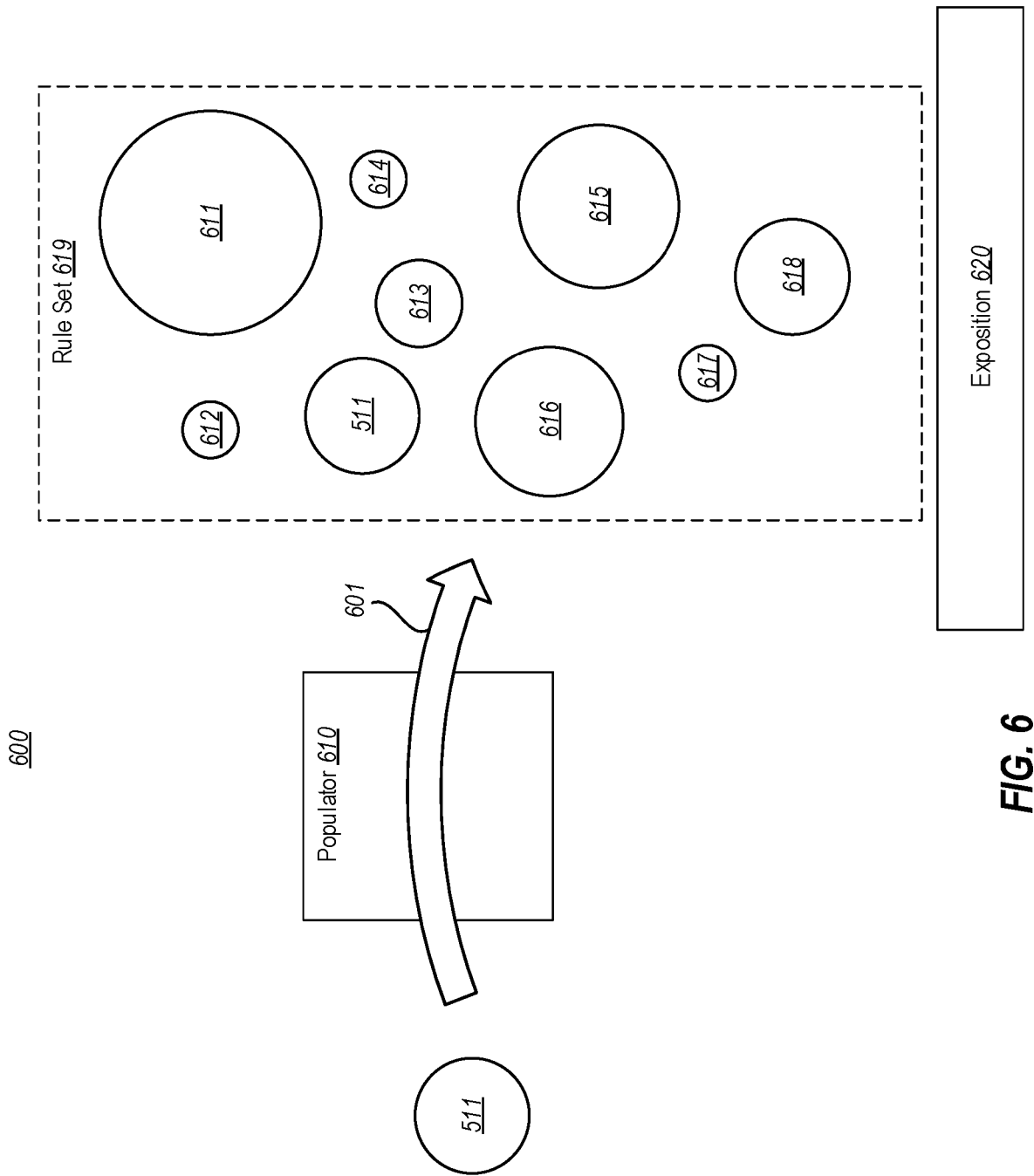
FIG. 6 illustrates an environment in which a rule is provided so as to expose the rule to be selectable.

FIG. 6 illustrates an environment 600 in which a rule (such as the generated rule 511 of FIG. 5) is provided so as to expose the rule to be selectable. For instance, in FIG. 6, a population component 610 populates (as represented by arrow 601) the rule 511 into a rule set 619 that are each exposed to uses via an exposition component 620. As such, FIG. 6 shows an environment in which the act 106 of FIG. 1 may be performed. The population component 610 may be structured as described below for the executable component 1306 of FIG. 13. The exposition component 620 may also be structured as described below for the executable component 1306 of FIG. 13, and/or the exposition component 620 may be an Application Program Interface (API).

As an example, the rule set 619 is illustrated as including rules 611 through 618, as well as the just added rule 511. Each rule in the rule set 619 corresponds to a different repetitive code edit, with each having a detector component (not shown) that causes the rule to find corresponding portions of code where the rule can be applied, as well as a transformer component (not shown) that causes the corresponding transformation to be applied at the detected portion. Thus, the rule set 619 constitutes a collection of rules that may be drawn upon by various users to allow transformations for repetitive edits to be automatically performed (perhaps with some minor effort by the user involved with simply verifying that the change is indeed what the user wants to make).

Note that each of the rules 619 is represented symbolically as a circle in FIG. 6. Furthermore, the circles have various sizes. This is to represent that different rules may have different credibility, scope of application, and/or conflict priority. Rules may gain in credibility, scope of applicability, and/or conflict priority by being subject to different levels of human review (or social review). As an example, rules 611 and 615 may be rules that have undergone a number of stages of social review, and thus may be regarded as highly credible. That is to say that the rule very highly represents an actual repetitive code edit that is of value and widely applicable across a variety of users in a variety of code settings. On the other hand, rule 612 is on the lower margins of credibility, perhaps awaiting further human review to determine whether the rule 612 should cease to exist, or whether the rule should gain in credibility.

Figure 7:
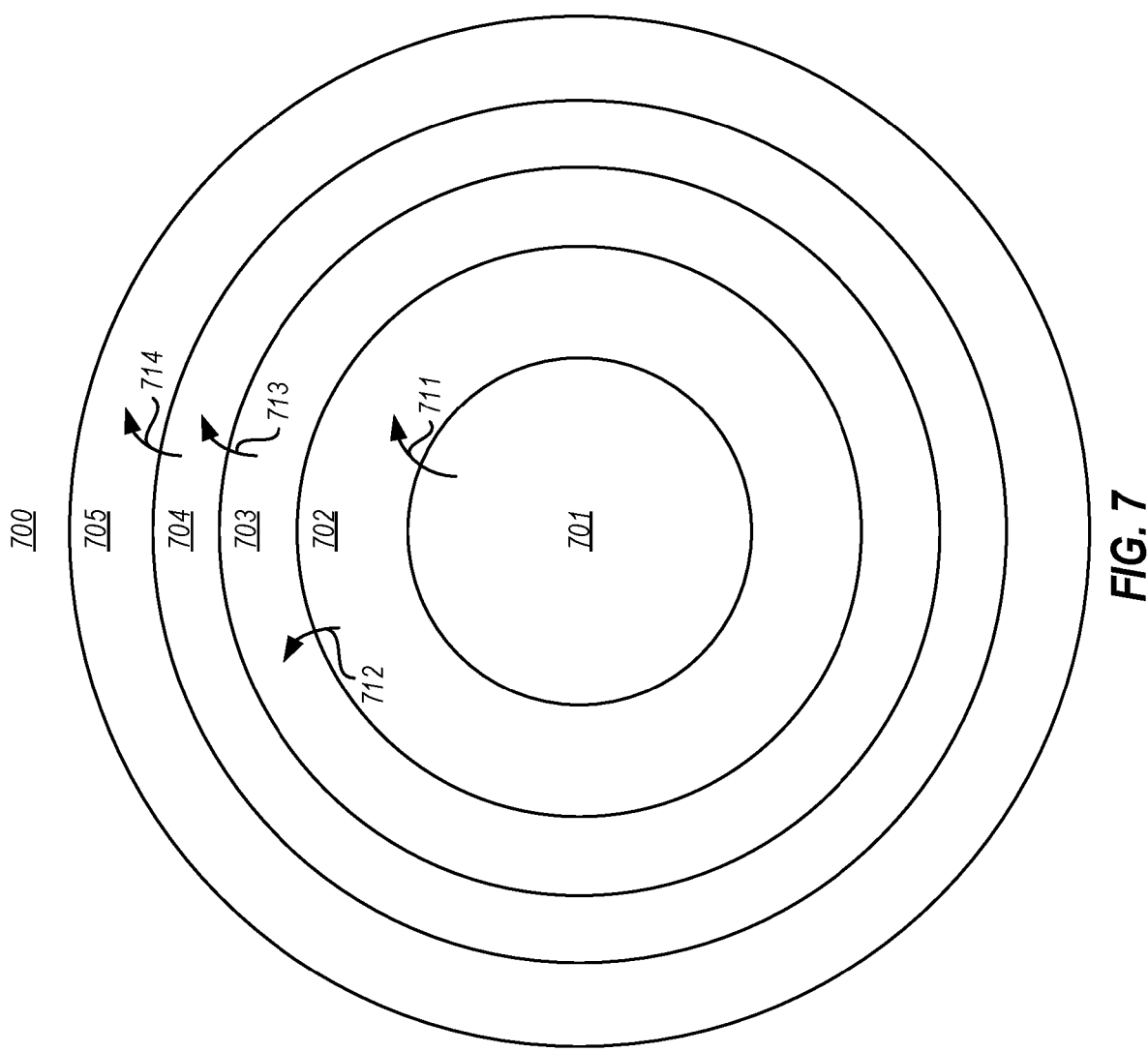
FIG. 7 illustrates various scopes of applicability that a rule might have, and also shows the effect of social review.

FIG. 7 illustrates various scopes 700 of applicability that a rule might have, and also shows the effect of social review. In the convention of FIG. 7, the larger regions generally have a broader scope of applicability than the smaller regions that they contain. For instance, region 701 has the narrowest scope of rule applicability, whereas region 705 has the broadest scope of rule applicability. Examples of the scopes 701 through 705 will now be explained.

The centermost region 701 is the narrowest scope. Here, the rule may be suggested to the developer, but not even the developer has yet accepted that the rule should be applied. Thus, at this point, while the transformation has been synthesized, it has not yet been accepted by any human. Perhaps at this stage, the computing system has not even gone through the effort of creating a rule (e.g., see rule 511 of FIG. 5) corresponding to the transformation (e.g., transformation 411A of FIG. 5). Thus, even prior to generating the corresponding rule (act 103), or at least prior to exposing the automatically generated corresponding rule (act 106), the method 100 may offer to the developer to automatically apply the transformation to other portions of the code.

Here, the generation of the corresponding rule occurs in response to the developer accepting the offer to automatically apply the transformation. In any case, once a rule is created, that rule may be applied at the appropriate scope, and even used to supplement learning of other transformations corresponding to other repetitive edits made by developers within that scope. In one example, there might be one hundred places in the code that the transformation may be applied. The user might choose to accept the transformation in several of the places, and then have the rule be created so that the developer may return to reviewing and accepting those transformations later for other places in the code.

If the developer approves of the transformation, the rule may advance (as represented by arrow 711) to the region 702. In region 702, the rule is committed to the developer's code repository in which the developer originally made the corresponding repetitive code edit. In one embodiment, generation of the rule (e.g., see rule 511 of FIG. 5) was deferred until at least the developer approved of the proposed transformation. Thus, rules that advance to the region 702 (e.g., to the developer's code repository) may be generated by hybrid intelligence including artificial intelligence in detecting the proposed repetitive code edit, as well as human intelligence in validating the proposed transformation as being a helpful rule.

The developer may also submit a pull request for team approval of the rule. If the team of code developers approve of the rule, then the applicability of the rule may advance further as represented by arrow 712 into region 703. Here, the rule is applicable to the entire portion of code that is being collaboratively authored by an entire team of developers. Likewise, further human review could advance (as represented by arrow 713) the rule to be applicable at the organizational level (e.g., company-wide) as represented by region 704. Even further human review (e.g., tacit review in the form of releasing a product in which the rule was used) could cause the rule to advance further (as represented by arrow 714) into region 705, so as to be consumable outside of the organization (e.g., by the public).

Thus, rules may become a commodity as they undergo various stages of social review, as humans (at each stage) decide whether or not to adopt the rule. That is, if the users within a particular scope decide to accept a proposed transformation made at that scope, then the corresponding rule is seen more and more as being accepted within that scope, and the credibility, scope of applicability, and/or conflict priority of the rule may be seen to further increase. If the users in a particular scope decline the proposed transformation to be made at that scope, then the corresponding rule is seen more and more as being rejected at that scope, and the credibility, scope of applicability, and/or conflict priority of the rule may be seen to decline. Thus, for each subsequent stage of social review that a rule passes, the rule gains in scope and credibility. Furthermore, for each subsequent stage of social review that a rule fails, the rule lowers in scope and credibility.

Accordingly, a mechanism has been described for generating rules based on transformations that were synthesized by observing repetitive code edits. The synthesized transformations may be used at edit time to apply repetitive code edits to other places in the case. Meanwhile, the corresponding generated rules may then be later used on other code to thereby cause the transformation to be widely available.

At this point, a mechanism to detect repetitive code edits, and synthesize corresponding transformations will now be described. However, first, an example user experience will be described with respect to FIGS. 8A through 8L in sequence. In this user experience, a developer makes a repeated edit. Thereafter, in an additional two separate instances, the computing system offers to perform the repeated edit for the developer. An edit with respect to line 17 of example code is described with respect to FIGS. 8A through 8E. Another edit representing a repeated edit similar to that made to line 17 is then performed with respect to line 18 of the code, as described with respect to FIGS. 8F to 8H. When the user moves to line 19 of the code, where the repeated edit could again be performed, the computing system offers to the developer to automatically perform the edit, as described with respect to FIGS. 8I and 8J. When the user moves to line 20 of the code, where again the repeated edit could be performed, the computing system once again offers to the developer to automatically perform the edit, as described with respect to FIGS. 8K and 8L.

Figures 8C, 8D:
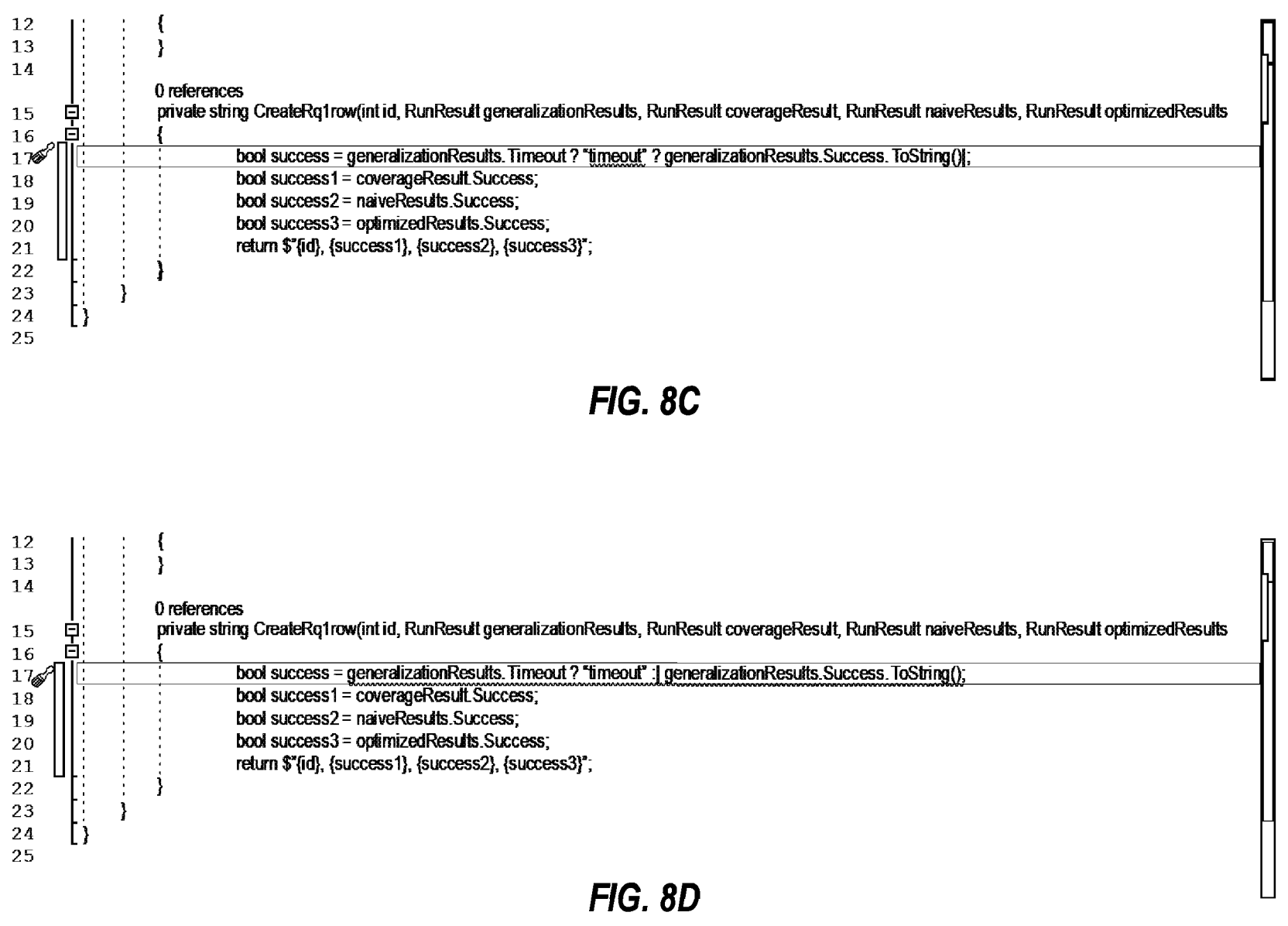

FIGS. 8A through 8E describe the user making several sub-edits in order to perform the initial edit. In general, the developer is attempting to cause the code to print a timeout should a run called "generalizationResults" take beyond a certain time to complete. FIG. 8A illustrates that the developer has navigated to line 17 of the code in order to perform the edit. In FIG. 8B, the developer has added the text "generalizationResults.Timeout? Timeout?" right before the text "generalizationResults. Success;". In FIG. 8C, the developer further adds the text ".ToString( )" right before the terminating semicolon. In FIG. 8D, the developer changes the second question mark to a colon. In FIG. 8E, the user replaces "bool" with "string". This represents a fairly comprehensive edit to line 17 of the code.

FIGS. 8F to 8H describe the user making several sub-edits in line 18 of the code, but now in a different order in order to perform the same (or a similar) larger edit as that described with respect to FIGS. 8A through 8E. This time, as shown in FIG. 8F, the user changes "bool" to "string" first. Then, as shown in FIG. 8G, the user adds "coverageResult.Timeout? "timeout":" after the equal symbol. In FIG. 8H, the user adds the text "ToString( )" prior to the terminating semicolon. Note that the variable name "coverageResult" in line 18 is different than the name of the variable "generalizationResults" in line 17. Furthermore, the constituent subedits are performed in a different order in the repeated edit of FIGS. 8F to 8H as compared to the initial edit in FIGS. 8A through 8E. Yet, the computing system recognizes that the developer has just, in a generalized sense, performed a repeated edit in line 18 of the edit performed in line 17. In response to the detection of this repeated edit, the computing system then synthesizes a transformation that, when applied, causes a generalized form of the repeated edit to be performed at other portions of the code.

Figures 8I, 8J:
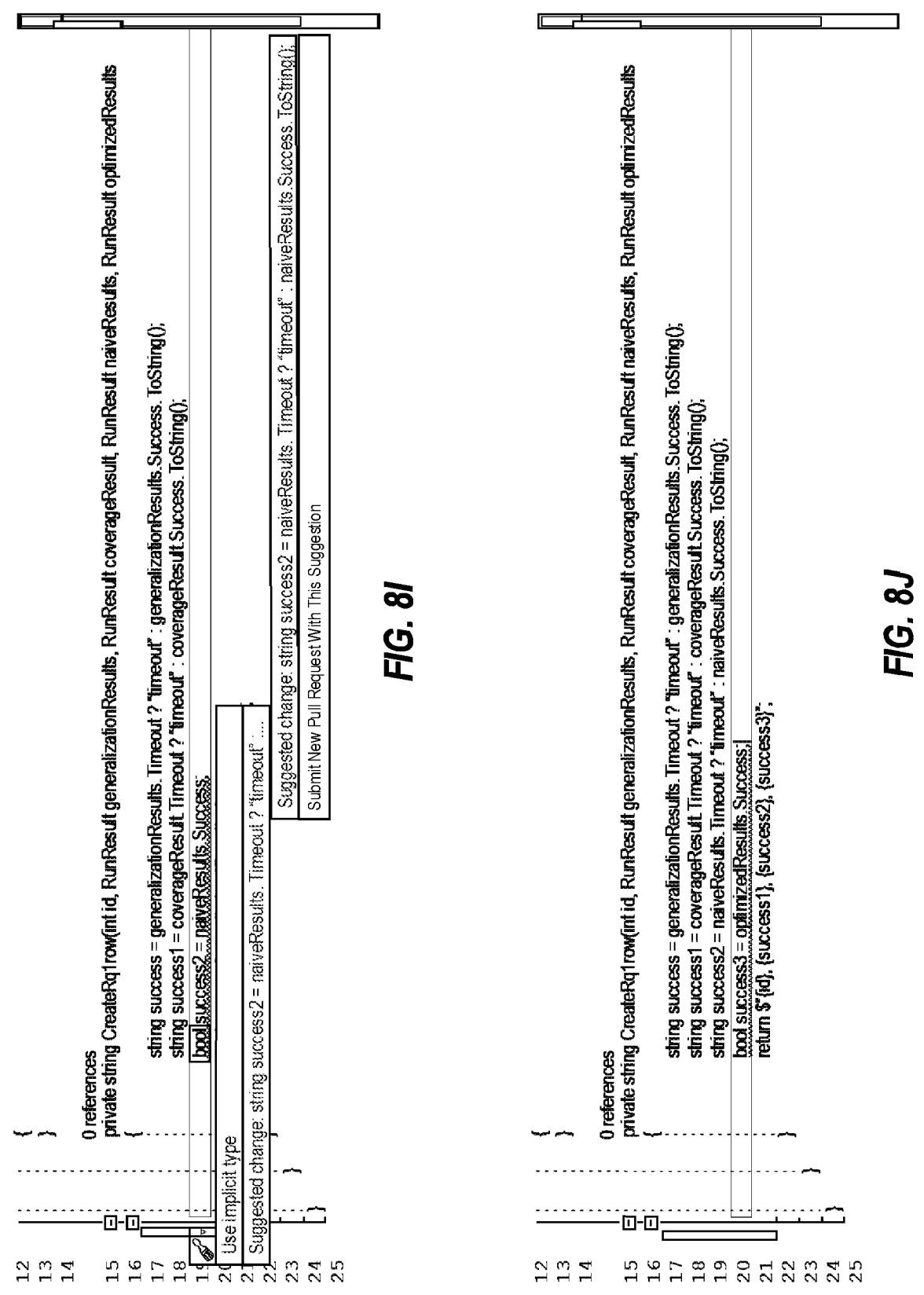

For example, in FIG. 8I, the developer navigates to line 19 with the intent of repeating the edit again. However, the computing system recognizes that the same repeated edit may be applied to line 19 as well. Accordingly, as shown in FIG. 8I, the computing system offers to perform the repeated edit for the developer, showing the developer what the edit would look like. The offering (also called herein a "suggestion") is the result of the synthesized transform being applied to a copy of the code of line 19.

This offer takes two forms. First, visual emphasis (e.g., adding a squiggly underline) of line 19 is made to represent to the developer that a context-specific repeated edit may be made to that line. Also, the offer takes the form of a window that shows the developer what the result of the transformation would look like. If the user accepts the suggestion, then the synthesized transformation is actually applied to the code at line 19, causing the transformation to be made to that portion of the code.

It is at this point that a rule may be generated for the synthesized transformation—resulting in a corresponding rule for the detected repetitive edit (see act 103 in FIG. 1). This would be the first stage of social review (represented by arrow 711 in FIG. 7), resulting in the rule being generated as applicable to the developer's code repository. For example, if the developer works on any other portion of the code of the developer's code repository, the developer may apply the rule to any other appropriate portion of that code, causing the transformation to be applied to that portion.

In addition, the window gives the user the chance to submit a new pull request associated with this suggestion. This would result in the entire team having a chance to review the rule. The team would then perhaps see how the rule would be applied to other portions of code, and make a determination (based on human review of how the rule would be applied in actual code) whether or not the rule should be accepted for broader review. Such acceptance is represented by arrow 712 in FIG. 7. Similarly, when the rule undergoes further stages of human review (represented by arrows 713 and 714), the rule may be applied to show the human how the code could be modified by the rule (again by applying the synthesized transform to a copy of the code), giving the user a very real sense for how application of the rule would actually look in various portions of code.

FIG. 8J illustrates the result of the developer accepting that offer, with the transformation automatically made to line 19. Note that the developer might have accepted that offer while the user is developing the code. On the other hand, the developer might accept the offer later as the line 19 may remain visually emphasized to keep the offer open.

Figures 8K, 8L:
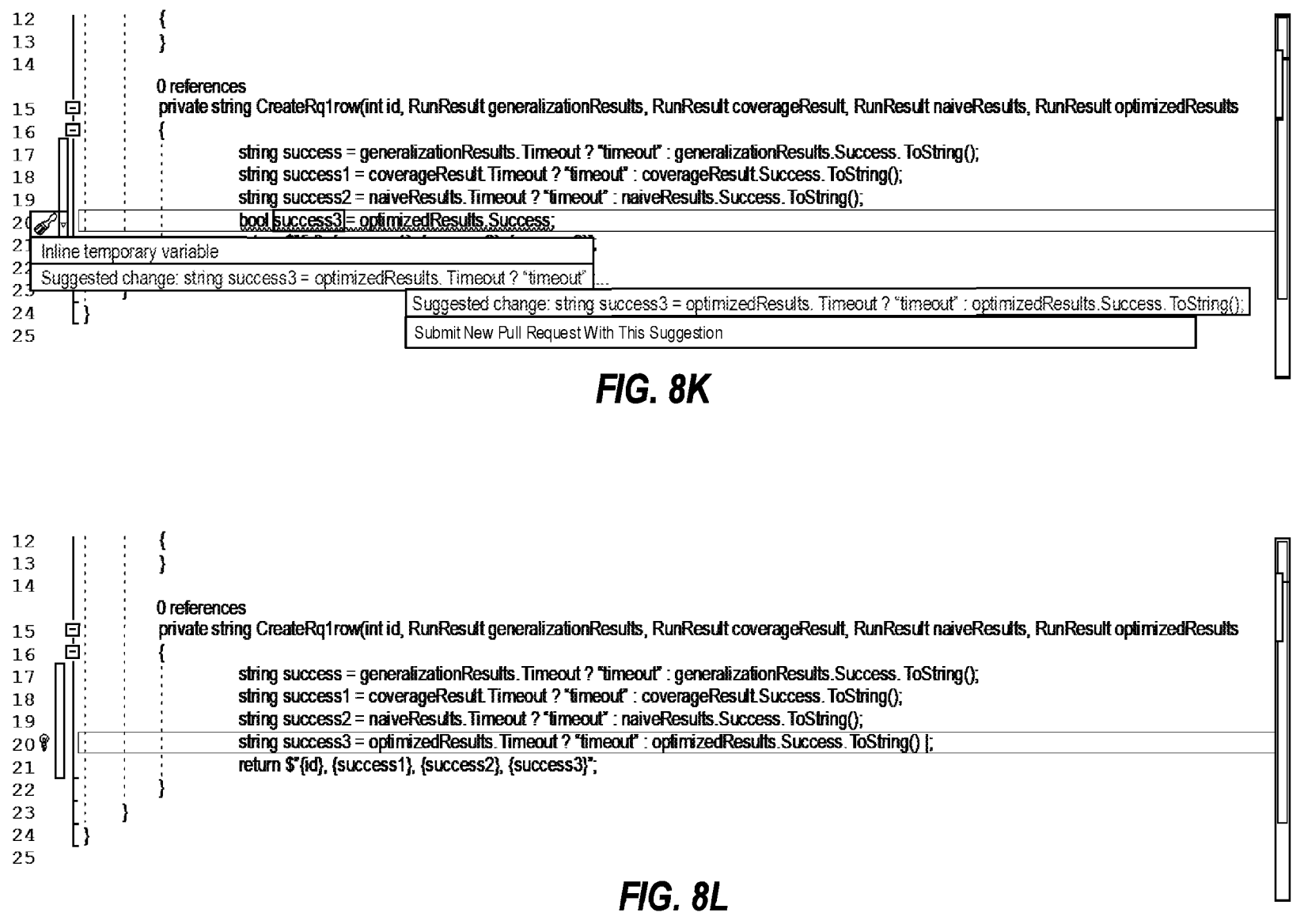

Finally, in FIG. 8K, the developer navigates to line 20 with the intent of repeating the edit again. The computing system again recognizes that the same repeated edit may be applied to line 20 as well. Accordingly, as shown in FIG. 8K, the computing system offers to perform the repeated edit for the developer. For instance, line 20 is also visually emphasized (e.g., underlined with squiggly underlining) to represent to the developer that the context-specific edit may be performed there. Furthermore, a window may open showing the developer what the result of the transformation would look like. In FIG. 8K, the user is again given the opportunity to submit a new pull request associated with the rule. FIG. 8L illustrates the result of the developer accepting that offer, with the transformation automatically applied to line 20.

The user experience is quite seamless, as the computing system simply offers to complete repeated transformations (i.e., repeated edits). This may even occur while the developer is editing the code, although the offer to perform the context-specific repeated edit may be accepted at any time. While the user experience is seamless, the technology that facilitates that experience is significant as will now be described.

Figure 9:
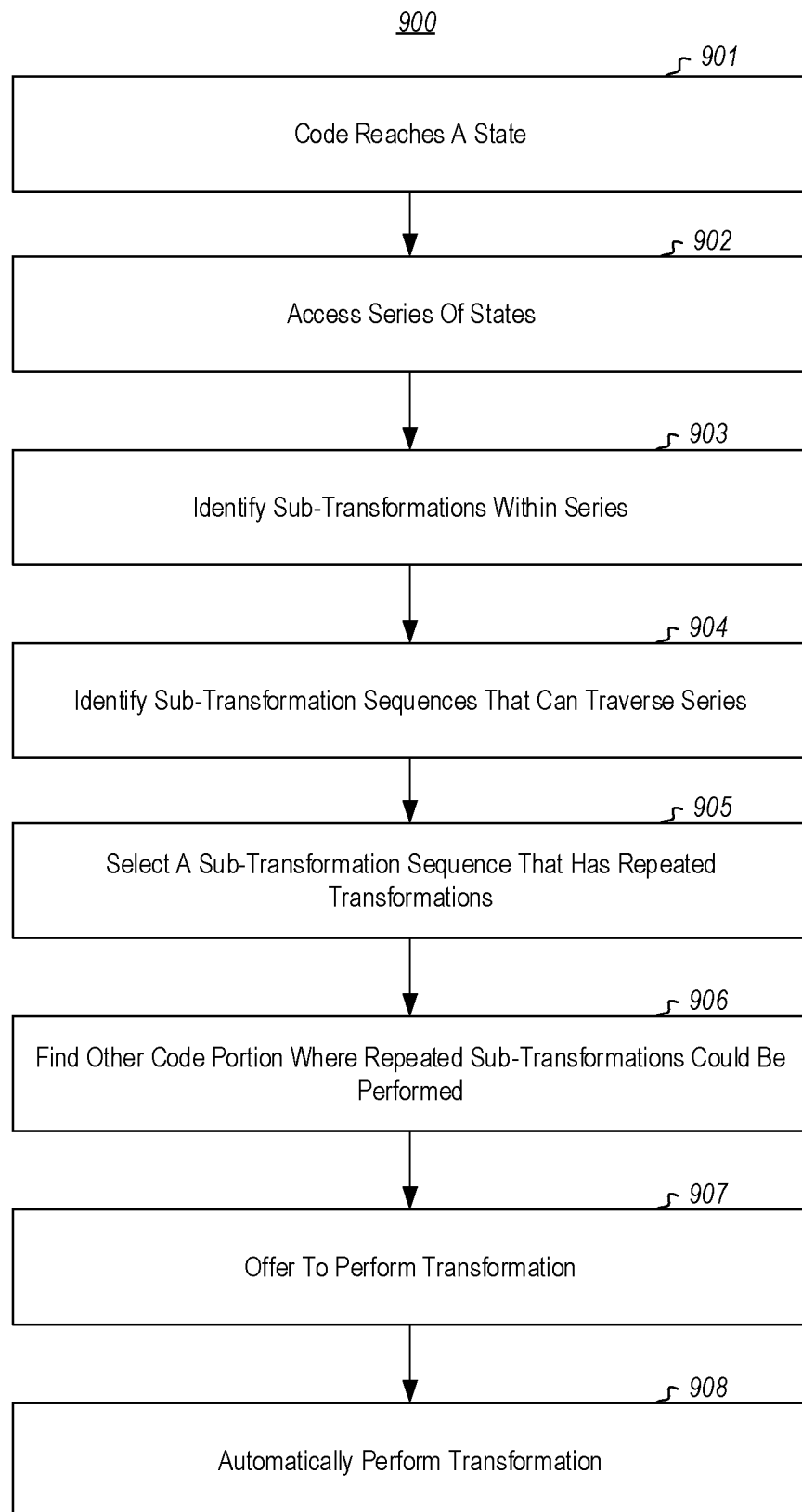
FIG. 9 illustrates a flowchart of a method for assisting automation of repeated edits for a developer that is modifying code, in accordance with the principles described herein.

FIG. 9 illustrates a flowchart of a method 900 for assisting automation of repeated edits for a developer that is modifying code. The repeated performance of the method 900 allows for user experiences such as the user experience described above with respect to FIGS. 8A through 8L. Accordingly, the method 900 will now be described with frequent reference to the user experience of FIGS. 8A through 8L as an example user experience only.

The method 900 may be performed by a computing system, such as the computing system 1300 described below with respect to FIG. 13. For instance, the method 900 may be performed by one or more processors (e.g., the hardware processing unit 1302) of the computing system 1300 executing computer-executable instructions that are on one or more computer-readable media (e.g., memory 1304). This computing system may be the same computing system that the developer is using to author code. Alternatively, the developer may edit the code on a client computing system, while the method 900 is performed on another computing system, such as in a cloud computing environment that has access to the code that the developer is editing.

Figure 10A:
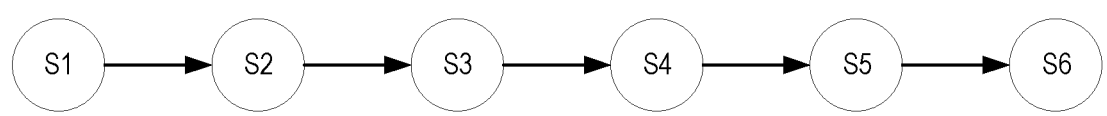
FIG. 10A illustrates an example representation of a series of states S1 to S6 in sequence, and is used as an example herein to explain the operation of the method of FIG. 9.

The method 900 is performed when the computing system observes that the code has passed into a state (act 901). The method 900 need not be performed every time that the code passes into a state though that certainly may be the case. FIG. 10A illustrates an example representation of a series 1000A of states S1 to S6 in sequence. In one embodiment, these states are parsable states on the assumption that unparsable states can be ignored. However, the broader principles described herein are not restricted to whether the states in the series 1000A are parsable or unparsable, or a mix.

In the example of FIG. 10A, suppose that the code has only just now entered state S6, thus triggering the performance of method 900. Referring to FIGS. 8A through 8L, the developer might just have completed the repeated edit (completing FIGS. 8A through 8H). The method 900 might have previously been performed once for each of states S1 to S5 in sequence. There may be results of these previous performances of the method 900 that may be reused for the performance of the method 900 upon the code reaching state S6. More generally stated, upon reaching any subsequent state, the method 900 may leverage upon the previous performances of the method 900. This significantly reduces the computation performed in completing the method 900 upon reaching a state, and thus reduces latency in presenting a suggestion after reaching that state. This makes it more likely that suggestions for repeated edits will be of higher quality and timely provided to a developer that is editing that code.

The method 900 includes accessing a series of states of code that a developer is modifying (act 902). For instance, referring to FIG. 10A, the series 1000A of states might be states S1 to S6. In one embodiment, it is not the code that the computing system uses to evaluate the code state, but rather an abstract syntax tree (or "AST") of that code at that state.

The method 900 also includes identifying multiple transformations that each represent state changes from a prior state of the series of states to a subsequent state in the series (act 903). Note that the usage of the term "transformation" as used for act 902 is different than the synthesized transformations that may be applied to alter code. Accordingly, to avoid confusion, the transformation of act 903 will be referred to as a "sub-transformation". The sub-transformations of this act 903 represent state changes from one of the code states to another of the code states.

Figure 10B:
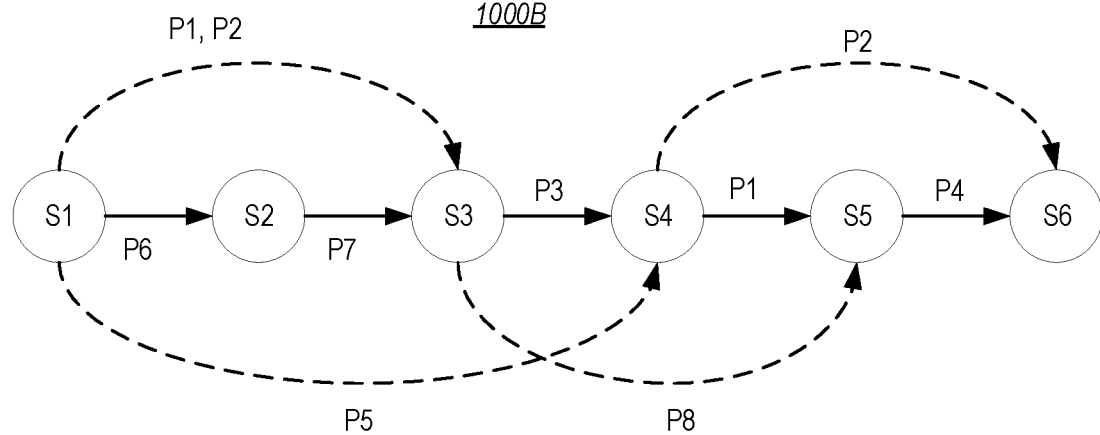
FIG. 10B illustrates an example representation of a directed acyclic graph of sub-transformations that is built upon the example series of FIG. 10A.

Referring to FIG. 10B, the series 1000A of states of FIG. 10A is again shown (as graph 1000B), but this time with several sub-transformations shown. The graph 1000B is now represented as a directed acyclic graph, where sub-transformations are represented by edges, and states are represented as nodes. The sub-transformations may be broadly represented, and programmatically synthesized based on the input code state and the output code state. As an example, the sub-transformations may be defined by a domain-specific program description language.

In the example of FIG. 10B, there are several instances of repeated sub-transformations within the graph 1000B. For instance, repeated sub-transformation P1 may be used to change the code from state S1 to S3, as well as from state S4 to S5. Sub-transformation P2 is also a repeated sub-transformation, in that the sub-transformation P2 may be used to change the code from state S1 to S3, as well as to change the code from state S4 to S6.

The example of FIG. 10B also shows instances of unrepeated sub-transformations within the graph 1000B. For instance, sub-transformation P3 may be used to change from state S3 to S4, sub-transformation P4 may be used to change from state S5 to S6, sub-transformation P5 may be used to change from state S1 to S4, sub-transformation P6 may be used to change from state S1 to S2, sub-transformation P7 may be used to change from state S2 to state S3, and sub-transformation P8 may be used to change from state S3 to state S5.

As previously mentioned, the results from previous performances of the method 900 may be reused in the performance of the method 900 upon the code reaching state S6. For instance, the method 900 was previously performed upon the code reaching state S2, and at that time, would identify sub-transformation P6 as being capable of transforming the code from state S1 to S2. Thereafter, the method 900 was performed upon the code reaching state S3, and would additionally identify sub-transformation P7 as being capable of transforming the code from state S2 to S3, and sub-transformations P1 and P2 as each being capable of transforming the code from state S1 to S3. Then, the method 900 was performed upon the code reaching state S4, and would additionally identify sub-transformation P3 as being capable of transforming the code from state S3 to S4, and sub-transformation P5 as being capable of transforming the code from state S1 to S4. Subsequently, the method 900 was performed upon the code reaching state S5, and would additionally identify sub-transformation P1 as being capable of transforming the code from state S4 to S5, and sub-transformation P8 as being capable of transforming the code from state S3 to S5.

The method 900 includes identifying sub-transformation sequences that may each be performed in order to traverse the series of states (act 904). To "traverse" the series of states means to arrive at a last state of the series of states from a first state of the series of states, though passage through every state is not required.

Figure 11:
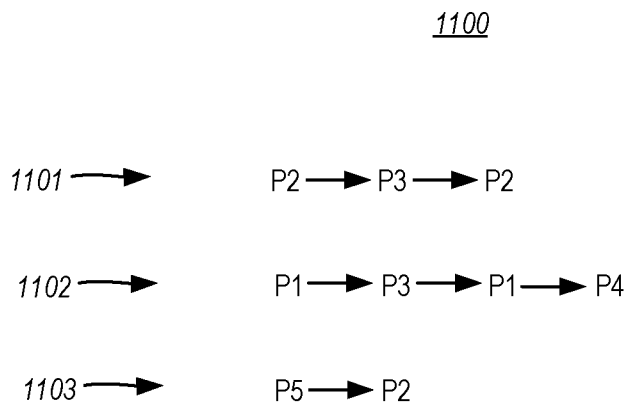

For instance, in FIG. 11, three sub-transformation sequences 1101, 1102 and 1103 are shown, each being capable of, when executed, transforming the code from state S1 to S6. As an example, sequence 1101 involves first performing sub-transformation P2 on state S1 which would result in state S3, then performing sub-transformation P3 on state S3 which would result in state S4, and finally for a second time performing sub-transformation P2 but on state S4 which would result in state S6. Also, in this example, sequence 1102 involves first performing sub-transformation P1 on state S1 which would result in state S3, then performing sub-transformation P3 on state S3 which would result in state S4, then for a second time performing sub-transformation P1 but on state S4 which would result in state S5, and finally performing sub-transformation P4 on state S5 which would result in state S6. As a final sequence in this example, sequence 1103 involves first performing sub-transformation P5 on state S1 which would result in state S4, and then performing sub-transformation P2 on state S4 which would result in state S6.

Note that the sequences 1101, 1102 and 1103 are not the only possible sub-transformation sequences that may be performed in order to go from state S1 to state S6. In fact, there are eleven possible sub-transformation sequences. The possible sub-transformation sequences include at least 1) P6 to P7 to P3 to P1 to P4, 2) P1 to P3 to P1 to P4, 3) P2 to P3 to P1 to P4, 4) P6 to P7 to P8 to P4, 5) P6 to P7 to P3 to P2, 6) P1 to P8 to P4, 7) P2 to P8 to P4, 8) P1 to P3 to P2, 9) P2 to P3 to P2, 10) P5 to P1 to P4, and 11) P5 to P2. Accordingly, the method 900 does not require than all possible sub-transformation sequences be identified. Furthermore, the beginning parts of all of these possible sub-transformation sequences may be obtained from prior performances of the method 900, thereby leveraging the prior performances of the method 900 in order to perform act 204 for state S6.

One or more of these identified sub-transformation sequences will have repeated sub-transformations. Accordingly, the method 900 includes identifying a particular sub-transformation sequence in the identified sub-transformation sequences as having a repeated sub-transformation (act 905). Referring to FIG. 4, there are two possible sub-transformation sequences 1101 and 1102 that have repeated sub-transformations. In sub-transformation sequence 1101, sub-transformation P2 is repeated. In sub-transformation sequence 1102, sub-transformation P1 is repeated.

Accordingly, in this case, multiple sub-transformation sequences are identified as having at least one repeated sub-transformation. Accordingly, the principles described herein allow for the selection of a single sub-transformation sequence that has a repeated sub-transformation. In one embodiment, this selection is based on at least one of 1) which of the sub-transformation sequences has most coverage of constituent repeated sub-transformations, and 2) which of the sub-transformation sequences has the most general repeated sub-transformations.

For instance, the repeated sub-transformation P2 is two-thirds of the entire sub-transformation sequence 1101, and the repeated sub-transformation P1 is only one half of the entire sub-transformation sequence 1102. Thus, if the sub-transformation sequence is selected based on coverage of constituent repeated sub-transformations, the sub-transformation sequence 1101 would be selected. Furthermore, sub-transformation P2 is a more general sub-transformation than sub-transformation P1. For instance, in at least some cases, sub-transformation P2 is more general than sub-transformation Ti. Thus, if the sub-transformation sequence is selected based on generality of constituent repeated sub-transformations, the sub-transformation sequence 1101 would still be selected. In one embodiment, the selection is based on coverage, with a tie broken by generality.

Alternatively, or in addition, the selection of the sub-transformation sequence is based on scores of the constituent repeated sub-transformation. That score might be based on a history of acceptance or rejection of suggested automation of this or similar repeated sub-transformations amongst this or a collection of developers, a degree or balance of generality versus specificity with an ideal degree or balance of the same, the nature of the output of the sub-transformation, and/or other attributes of the sub-transformation.

In the example of FIGS. 8A through 8L, the repeated sub-transformation P2 may represent the repeated edit that is made to both line 17 (as shown in FIGS. 8A through 8E) as well as line 18 (as shown in FIGS. 8F through 8H). There were other repeated edits—such as the changing of the string "bool" to "string", which were rejected in favor of the more general edit made throughout each respective line of code.

By selecting one of the sub-transformation sequence, and providing that sequence in executable form (as transformation 411A of FIG. 4), a transformation is thus synthesized. Optionally, the method 900 then evaluates the code to determine that the repeated transformation may be performed in at least one other location in the code (act 906). The method 900 also includes offering to the developer to perform the repeated transformation in the selected sub-transformation sequence (act 907). This offer may occur while the developer is still working on modifying the code. For instance, if the sub-transformation sequence 1101 in FIG. 11 was selected (in act 905), then the computing system would offer to the developer to automatically perform the repeated transformation 1101, potentially conditioned upon the computing system confirming there is at least one other location in the code where the transformation 1101 could be performed (act 906). In the example of FIGS. 8A through 8L, the computing system makes a first offer for line 19 in FIG. 8I, and a second offer for line 20 in FIG. 8K.

Finally, in response to receiving an indication from the developer that the repeated transformation is to be applied, the computing system automatically performs the repeated transformation for at least one other portion (and perhaps multiple other portions) of the code (act 908). As an example, the developer may be presented with the offer via the user interface that the developer is actually using to modify the code, and may accept that offer via the same user interface. In the example of FIGS. 8A through 8L, the computing system automatically performs the edit to line 19 as shown in FIG. 8J, and automatically performs the edit to line 20 as shown in FIG. 8L.

Figure 12:
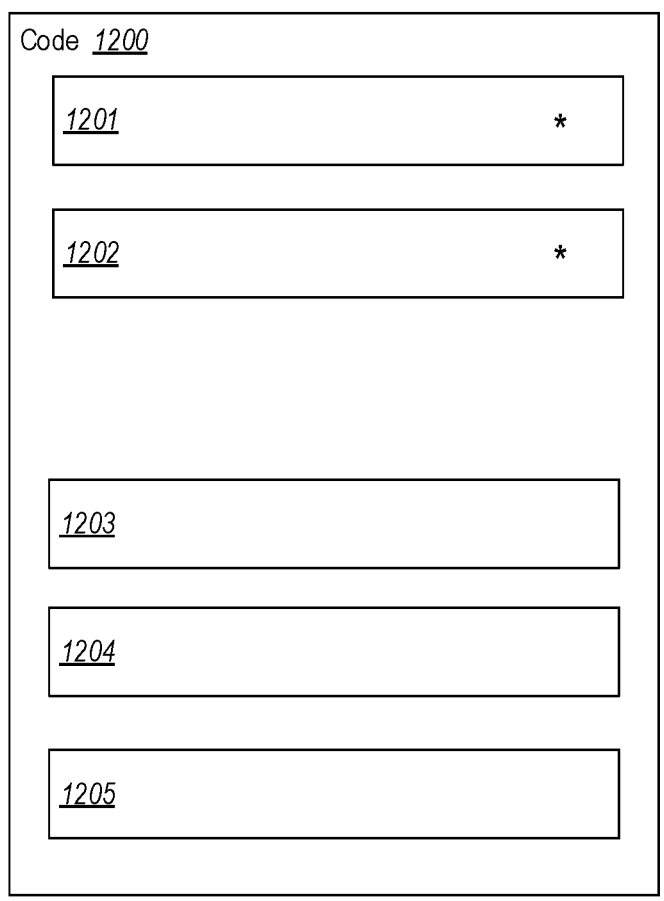
FIG. 12 illustrates code that includes five portions where the repeated transformation could be applied, including two portions where the developer manually performed a repeated edit, and three other portions where the computing system may automatically perform the repeated edit for the user.

More generally speaking, FIG. 12 illustrates code 1200 that includes five portions 1201 through 1205 where the repeated transformation could be applied. Portions 1201 and 1202 are marked with an asterisk to represent that these are portions that the developer manually edited to allow the computing system to recognize that a repeated edit is being performed. Then, the computing system may offer to the user to perform the repeated transformation throughout the remainder of the code (e.g., at portions 1203, 1204 and 1205). In one case, at each location 1203, 1204, and 1205, prior to automatically making the edit, the computing system may show how the repeated transformation may be applied to that portion—perhaps showing the input to, and the output from, that repeated transformation. If the user likes how the transformation would be applied, the developer may select a control to accept that transformation so that it is automatically applied to the corresponding portion of the code.

As explained previously, the method 900 may be performed perhaps as often as each time the code enters a state. Thus, although the number of states S1 through S6 in the example series 1000A of FIG. 10A is six, that number may increase as further edits are made to the code. In order to keep the calculation of suggested repeated edits less complex, and thus more quickly performed, and thus more relevant to what the developer is doing, the number of states evaluated may be kept within a certain predetermined limit.

For instance, the number of states might be limited to 20 states. Thus, at some future time, the computing system may evaluate the series of states from S1 to S20. If a new state S21 is then added to the series (due to further modification of the code by the developer), the oldest state S1 may then be removed. Thus, in the next iteration of the method 900, perhaps the series from S2 to S21 is evaluated. In this manner, the series being evaluated may be a rolling series of states with new states being added to the series, and older states being removed from the series, as the developer continues to modify the code. As an older state is removed, sub-transformations that originated at that older state may be forgotten or removed from consideration.

There are other ways to make the computation of the suggested edit less cumbersome. Another way is to limit the number of sub-transformations being analyzed for potential building of sub-transformation sequences. Yet another way is to limit the number of sub-transformation sequences being built from sub-transformations. As a simple example, sub-transformation sequences may be limited to sub-transformations that do not overlap. Another way is to limit the total span of a sub-transformation. For instance, perhaps a sub-transformation is limited to skip over no more than a certain number of states. As an example, if the limit was four, a sub-transformation spanning S7 to S11 would be permitted, but not a sub-transformation spanning S7 to S12.

Accordingly, the principles described herein provide an effective mechanism to synthesize transformations that, when applied, provide suggestions of repeated edits to the developer, and automate the repeated edits for the developer. This may even be done without the user having to leave the code editing environment, and preferably with the developer's full knowledge of how the repeated edits are applied, and with permission from the developer. Furthermore, the repeated edits are context-specific, in that they are identified based on active observation of what the developer is doing, or has done, to the code.

Note that the performance of the methods 100 and 900, as well as the development environment, may be performed by a computing system. Accordingly, a computing system will now be described with respect to FIG. 13. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 13:
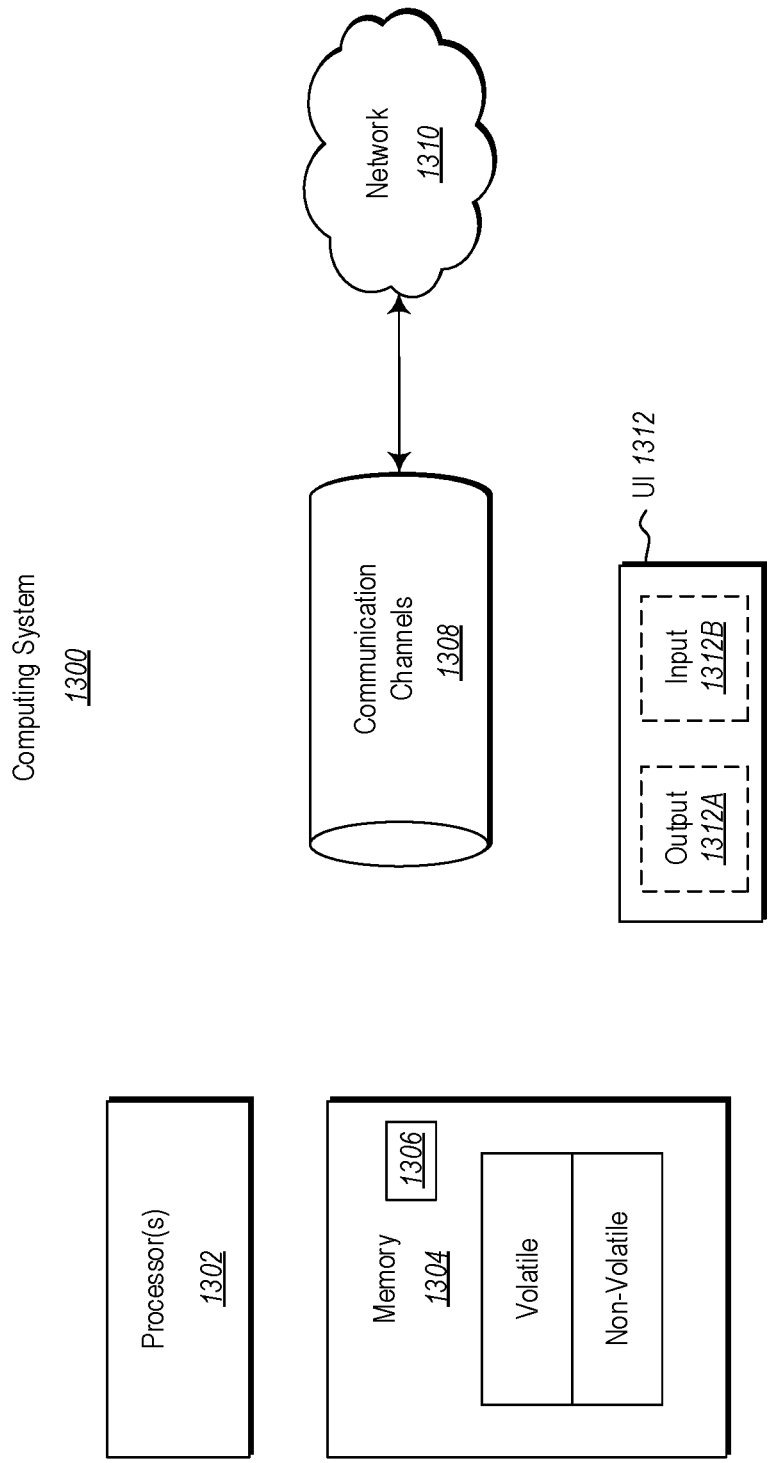
FIG. 13 illustrates an example computer system in which the principles described herein may be employed.

As illustrated in FIG. 13, in its most basic configuration, a computing system 1300 typically includes at least one hardware processing unit 1302 and memory 1304. The memory 1304 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1300 has thereon multiple structures often referred to as an "executable component". For instance, the memory 1304 of the computing system 1300 is illustrated as including executable component 1306. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 1304 of the computing system 1300. Computing system 1300 may also contain communication channels 1308 that allow the computing system 1300 to communicate with other computing systems over, for example, network 1310.

While not all computing systems require a user interface, in some embodiments, the computing system 1300 includes a user interface 1312 for use in interfacing with a user. The user interface 1312 may include output mechanisms 1312A as well as input mechanisms 1312B. The principles described herein are not limited to the precise output mechanisms 1312A or input mechanisms 1312B as such will depend on the nature of the device. However, output mechanisms 1312A might include, for instance, speakers, displays, tactile output, holograms, virtual reality, and so forth. Examples of input mechanisms 1312B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage devices having stored thereon computer-executable instructions that are structured such that, when executed by the one or more processors, cause the computing system to perform a method for generating at least one rule that assists in code generation, the method comprising:
   detecting a repetitive code edit made by a developer to code;
   synthesizing a transformation that, when applied to the code, performs a code modification corresponding to the detected repetitive code edit, wherein the synthesized transformation includes an initial state definition that defines an initial state of the code to which the synthesized transformation is applied, and a corresponding modification from the defined initial state of the code to which the synthesized transformation is applied;
   automatically generating a rule that includes a detector mechanism that, when selected, is configured to find locations in the code that have the defined initial state of the code to which the synthesized transformation is applied, and that includes a transformer mechanism that, when selected, is configured to perform the code modification corresponding to the detected repetitive code edit;
   determining whether the automatically generated rule is in conflict with previously exposed automatically generated rules; and
   in response to determining that the automatically generated rule does not conflict with the previously exposed automatically generated rules, exposing the automatically generated rule so that the detector mechanism and the transformer mechanism are selected, such that the automatically generated rule is used to automatically apply the synthesized transformation to transform the code.

2. The computing system in accordance with claim 1, wherein prior to automatically generating the rule, the method further comprises:
   offering to a developer that is making the detected repetitive code edit to automatically apply the synthesized transformation to transform other portions of the code, wherein the automatic generation of the rule occurs in response to the developer accepting the offer to automatically apply the synthesized transformation to transform the other portions of the code.

3. The computing system in accordance with claim 1, wherein prior to exposing the automatically generated rule, the method further comprises:
   offering to a developer that is making the detected repetitive code edit to automatically apply the synthesized transformation to transform other portions of the code, wherein the exposing of the automatically generated rule occurs in response to the developer accepting the offer to automatically apply the synthesized transformation to transform the other portions of the code.

4. The computing system in accordance with claim 1, wherein the exposing of the automatically generated rule has a second scope of the code that is broader than a first scope of the code in which the repetitive code edit was detected.

5. The computing system in accordance with claim 4, wherein the first scope of the code comprises a code repository in which the developer that is making or that made the detected repetitive code edit works, and wherein the second scope of the code comprises code that multiple developers contribute to.

6. The computing system in accordance with claim 4, wherein the first scope of the code comprises a code repository in which the developer that is making or that made the detected repetitive code edit works, and wherein the second scope of the code comprises exposure of the automatically generated rule outside of an organization in which the developer works.

7. The computing system in accordance with claim 1, wherein the method is applied to multiple repetitive code edits made by the developer to the code to automatically generate a plurality of rules.

8. The computing system in accordance with claim 7, the method further comprising exposing at least some of the automatically generated plurality of rules to a plurality of stages of social review.

9. The computing system in accordance with claim 8, wherein for each subsequent stage of the plurality of stages of social review that an automatically generated rule passes, the automatically generated rule gains in priority in case of conflicting automatic ally generated rules.

10. The computing system in accordance with claim 8, wherein for each subsequent stage of the plurality of stages of social review that an automatically generated rule fails, the automatically generated rule lowers in priority in case of conflicting automatically generated rules.

11. The computing system in accordance with claim 1, the method further comprising, prior to exposing the automatically generated rule:
  determining that the automatically generated rule does not conflict with previously exposed automatically generated rules that have a conflict priority above a conflict priority of the automatically generated rule.

12. The computing system in accordance with claim 1, wherein the exposing of the automatically generated rule occurs outside of an edit environment of a developer.

13. The computing system in accordance with claim 1, wherein the exposing of the automatically generated rule supplements learning of other repetitive code edits made by the developer to the code.

14. A method for generating at least one rule that assists in code generation, the method comprising:
  detecting a repetitive code edit made by a developer to code;
  synthesizing a transformation that, when applied to the code, performs a code modification corresponding to the detected repetitive code edit, wherein the synthesized transformation includes an initial state definition that defines an initial state of the code to which the synthesized transformation is applied, and a corresponding modification from the defined initial state of the code to which the synthesized transformation is applied;
  automatically generating a rule that includes a detector mechanism that, when selected, is configured to find locations in the code that have the defined initial state of the code to which the synthesized transformation is applied, and that includes a transformer mechanism that, when selected, is configured to perform the code modification corresponding to the detected repetitive code edit;
  determining whether the automatically generated rule is in conflict with previously exposed automatically generated rules; and
  in response to determining that the automatically generated rule does not conflict with the previously exposed automatically generated rules, exposing the automatically generated rule so that the detector mechanism and the transformer mechanism are selected, such that the automatically generated rule is used to automatically apply the synthesized transformation to transform the code.

15. The method in accordance with claim 14, wherein prior to automatically generating the rule, the method further comprises:
  offering to a developer that is making the detected repetitive code edit to automatically apply the synthesized transformation to transform other portions of the code, wherein the automatic generation of the rule occurs in response to the developer accepting the offer to automatically apply the synthesized transformation to transform the other portions of the code.

16. The method in accordance with claim 14, wherein the exposing of the automatically generated rule has a second scope of the code that is broader than a first scope of the code in which the repetitive code edit was detected.

17. The method in accordance with claim 14, further comprising exposing the automatically generated rule to a plurality of stages of social review.

18. The method in accordance with claim 17, wherein for each subsequent stage of the plurality of stages of social review that the automatically generated rule passes, the automatically generated rule gains in priority in case of conflicting automatically generated rules, and for each subsequent stage of the plurality of stages of social review that the automatically generated rule fails, the automatically generated rule lowers in priority in case of conflicting automatically generated rules.

19. A computer program product comprising one or more computer-readable hardware storage devices having stored thereon computer-executable instructions that are structured such that, when executed by one or more processors of a computing system, cause the computing system to perform a method for generating at least one rule that assists in code generation, the method comprising:
  detecting a repetitive code edit made by a developer to code;
  synthesizing a transformation that, when applied to the code, performs a code modification corresponding to the detected repetitive code edit, wherein the synthesized transformation includes an initial state definition that defines an initial state of the code to which the synthesized transformation is applied, and a corresponding modification from the defined initial state of the code to which the synthesized transformation is applied;
  automatically generating a rule that includes a detector mechanism that, when selected, is configured to find locations in the code that have the defined initial state of the code to which the synthesized transformation is applied, and that includes a transformer mechanism that, when selected, is configured to perform the code modification corresponding to the detected repetitive code edit;
  determining whether the automatically generated rule is in conflict with previously exposed automatically generated rules; and
  in response to determining that the automatically generated rule does not conflict with the previously exposed automatically generated rules, exposing the automatically generated rule so that the detector mechanism and the transformer mechanism are selected, such that the automatically generated rule is used to automatically apply the synthesized transformation to transform the code.

* * * * *